(12) United States Patent
McIsaac et al.

(10) Patent No.: US 7,917,961 B2
(45) Date of Patent: *Mar. 29, 2011

(54) SYSTEM AND METHOD FOR CONTROLLING ACCESS TO AN ELECTRONIC MESSAGE RECIPIENT

(75) Inventors: Joseph McIsaac, Burlington, MA (US); Marcus Dahllöf, Philadelphia, PA (US); Bruce Tatarsky, Nashua, NH (US); Richard Vallett, Wilmington, MA (US)

(73) Assignee: Reflexion Networks, Inc., Woburn, MA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 11/137,031

(22) Filed: May 25, 2005

(65) Prior Publication Data

US 2006/0112433 A1 May 25, 2006

Related U.S. Application Data

(60) Provisional application No. 60/574,239, filed on May 25, 2004.

(51) Int. Cl.
 G06F 7/04 (2006.01)
 G06F 15/16 (2006.01)
(52) U.S. Cl. .............. 726/28; 726/2; 709/227; 709/229; 709/238; 370/351
(58) Field of Classification Search .................... 726/28, 726/2, 3, 26, 27; 709/227, 206, 214, 224, 709/245, 238, 229; 370/351
See application file for complete search history.

(56) References Cited

U.S. PATENT DOCUMENTS 5,930,479 A * 7/1999 Hall .............................. 709/238
(Continued)

FOREIGN PATENT DOCUMENTS

JP 2000-339236 12/2000
(Continued)

OTHER PUBLICATIONS

Non-Final Office action dated Jun. 9, 2008 for U.S. Appl. No. 10/523,760.
(Continued)

*Primary Examiner* — Eleni A Shiferaw
(74) *Attorney, Agent, or Firm* — Pierce Atwood LLP; Joseph M. Maraia; Christopher E. Everett

(57) ABSTRACT

A system and method for selectively allowing or denying access to a user coupled to an electronic communications network includes a receiver that receives an inbound message over the electronic communications network from a sender. The inbound message includes an identifier that is associated with a sender and an identifier that is associated with a recipient. The system also includes a processor that determines if the identifier associated with the recipient was previously generated by the user and is absent from a plurality of proxy identifiers associated with the recipient. The processor is further determines one of at least three security states associated with the inbound message. A first security state is indicative of allowing delivery of the inbound message to the user. A second security state is indicative of denying delivery of the inbound message to the user. A third security state is indicative of conditionally allowing delivery of the message to the user. Each of the three security states are associated with the sender identifier and the recipient identifier included in the inbound message.

60 Claims, 13 Drawing Sheets

U.S. PATENT DOCUMENTS

| | | | | |
|---|---|---|---|---|
| 5,999,932 | A * | 12/1999 | Paul | 707/10 |
| 6,112,227 | A | 8/2000 | Heiner | |
| 6,192,114 | B1 * | 2/2001 | Council | 379/114.14 |
| 6,199,102 | B1 | 3/2001 | Cobb | |
| 6,377,993 | B1 | 4/2002 | Brandt et al. | |
| 6,591,291 | B1 * | 7/2003 | Gabber et al. | 709/206 |
| 7,058,684 | B1 * | 6/2006 | Ueda | 709/206 |
| 7,472,422 | B1 * | 12/2008 | Agbabian | 726/25 |
| 2003/0158905 | A1 | 8/2003 | Petry et al. | |
| 2003/0158960 | A1 * | 8/2003 | Engberg | 709/237 |
| 2004/0003041 | A1 * | 1/2004 | Moore et al. | 709/204 |
| 2004/0049696 | A1 * | 3/2004 | Baker et al. | 713/201 |
| 2004/0123153 | A1 * | 6/2004 | Wright et al. | 713/201 |
| 2005/0021938 | A1 * | 1/2005 | Kidokoro | 713/152 |
| 2005/0038893 | A1 * | 2/2005 | Graham | 709/228 |
| 2005/0235324 | A1 * | 10/2005 | Makipaa et al. | 725/60 |
| 2007/0083425 | A1 * | 4/2007 | Cousineau et al. | 705/14 |

FOREIGN PATENT DOCUMENTS

| | | |
|---|---|---|
| WO | WO 01/16695 | 3/2001 |
| WO | WO 2004/015583 | 2/2004 |

OTHER PUBLICATIONS

Final Office action dated Feb. 18, 2009 for U.S. Appl. No. 10/523,760.

Non-Final Office Action dated Oct. 1, 2009 issued in U.S. Appl. No. 10/523,760.

Par. 136, Postel, Jonathan, Simple Mail Transfer Protocol, RFC 821, Aug. 1982, Information Sciences Institute, available at http://www.ietf.org/rfc/rfc0821.

Par. 134, Freed, N. et al., Multipurpose Internet Mail Extensions (MIME) Part One: Format of Internet Message Bodies, Nov. 1996, RFC 2045, Network Working Group.

Abhay Bhushan et al., Standarizing Network Mail Headers, RFC 561, Sep. 5, 1973, http://www.ietf.org/rfc/rfc0561.txt.

Jon Postel, On the Junk Mail Problem, RFC 706, Nov. 1975, http://www.ietf.org/rfc/rfc0706.txt.

Suzanne Sluizer et al., Mail Transfer Protocol, RFC 780, May 1981, http://www.ietf.org/rfc/rfc0780.txt.

Jonathan B. Postel, Simple Mail Transfer Protocol, RFC 788, Nov. 1981, http://www.ietf.org/rfc/rfc0788.txt.

J. Klensin, Editor, Simple Mail Transfer Protocol, RFC 2821, Apr. 2001, http://www.ietf.org/rfc/rfc2821.txt.

K. Murchison, Sieve Email Filtering—Subaddress Extension, RFC 3598, Sep. 2003, http://www.ietf.org/rfc/rfc3598.txt.

C. Daboo, Sieve Email Filtering: Spamtest and VirusTest Extensions, RFC 3685, Feb. 2004, http://www.ietf.org/rfc/rfc3685.txt.

* cited by examiner

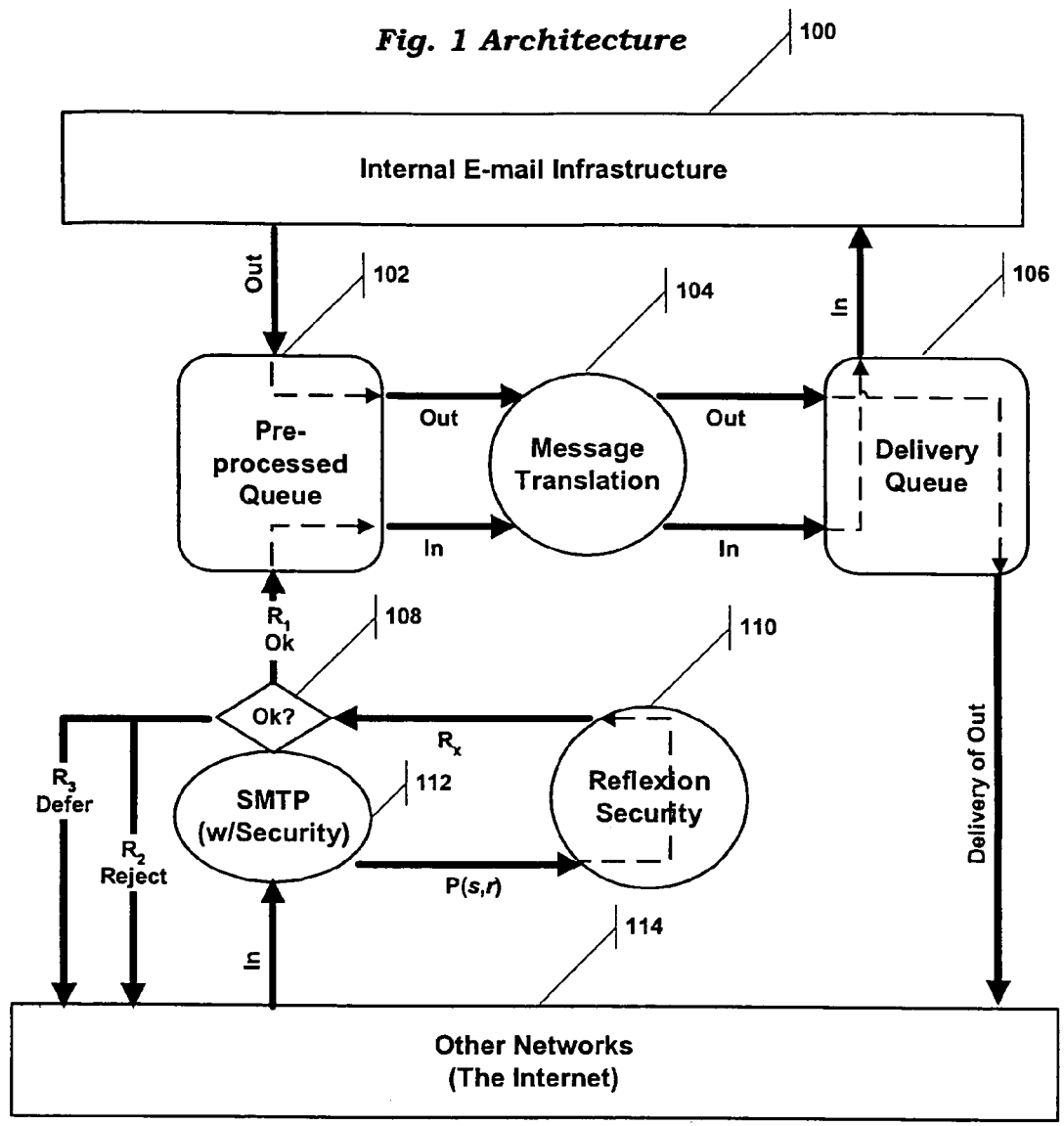
*Fig. 1 Architecture*
Legend:  $s$ = sender identity
$r$ = recipient identity
$P(s,r)$ = Request security status on a message from $s$ to $r$
$R_x$ = Security status on a message from s to r
    $R_1$ = Ok, continue processing message
    $R_2$ = Reject, do not process the message
    $R_3$ = Defer, temporarily defer the message back to the sending server

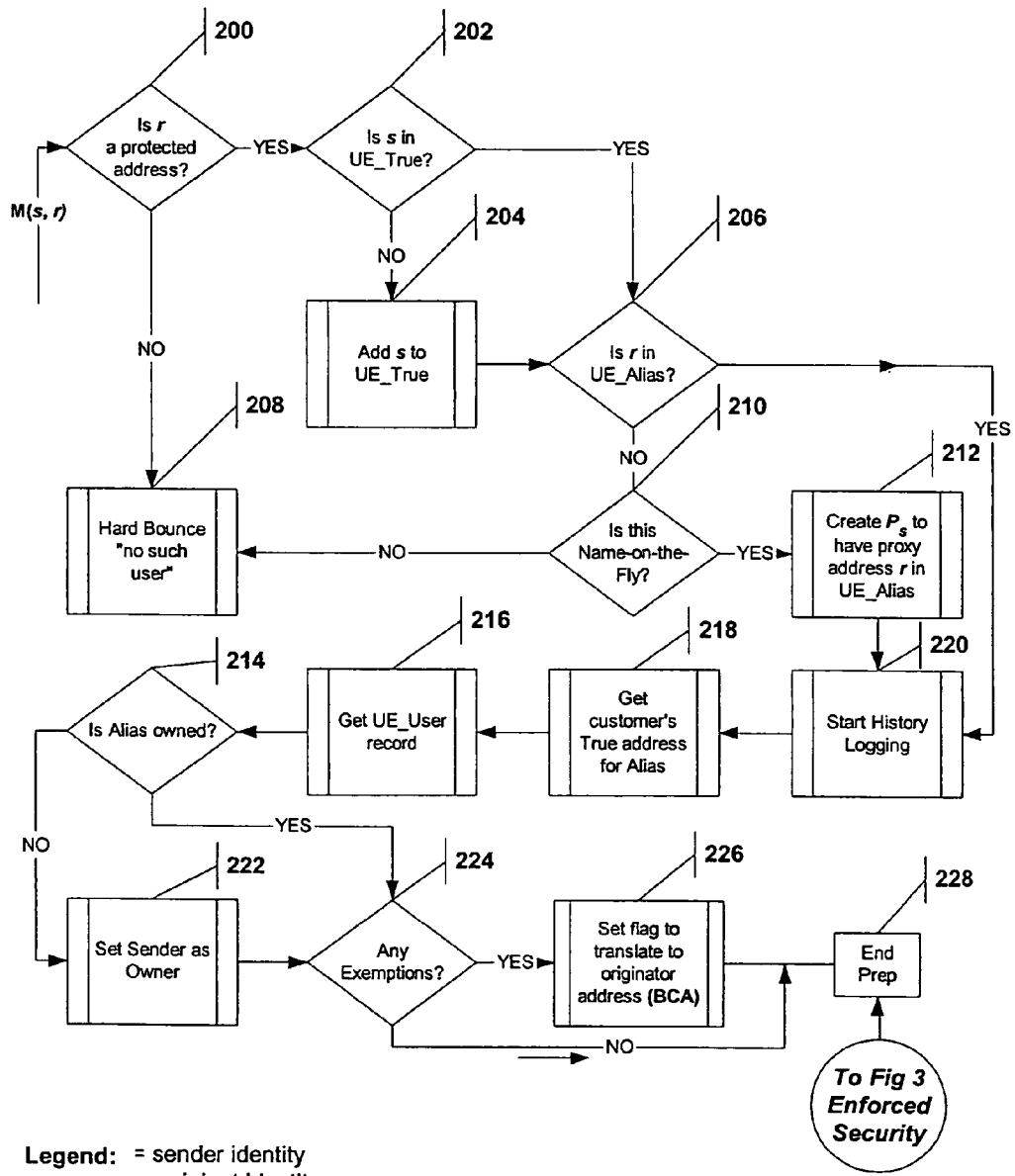

Fig. 2 Inbound Message Preparation

Legend: s = sender identity
r = recipient identity
M(s,r) = A message from s to r
UE_TRUE is a database table containing "real" (i.e. non-proxy) addresses
UE_ALIAS is a database table containing proxy addresses
UE_User is a database table containing user information
BCA = "Business Card Address", the originator address managed by the internal mail transport agent (i. e. mail server)
$P_s$ is the security settings for the proxy address registered to s for user that owns originator address to which proxy r is a substitute

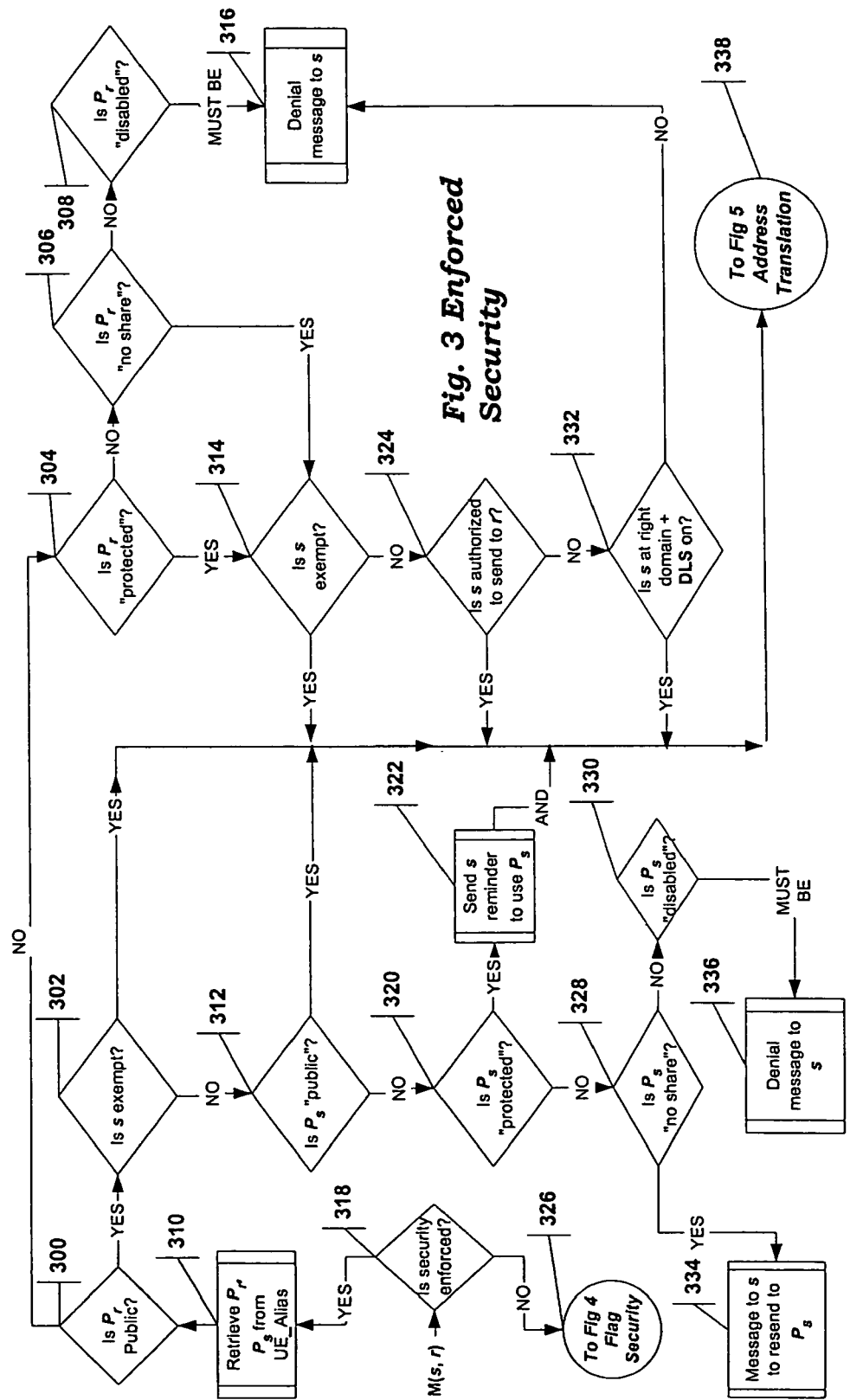

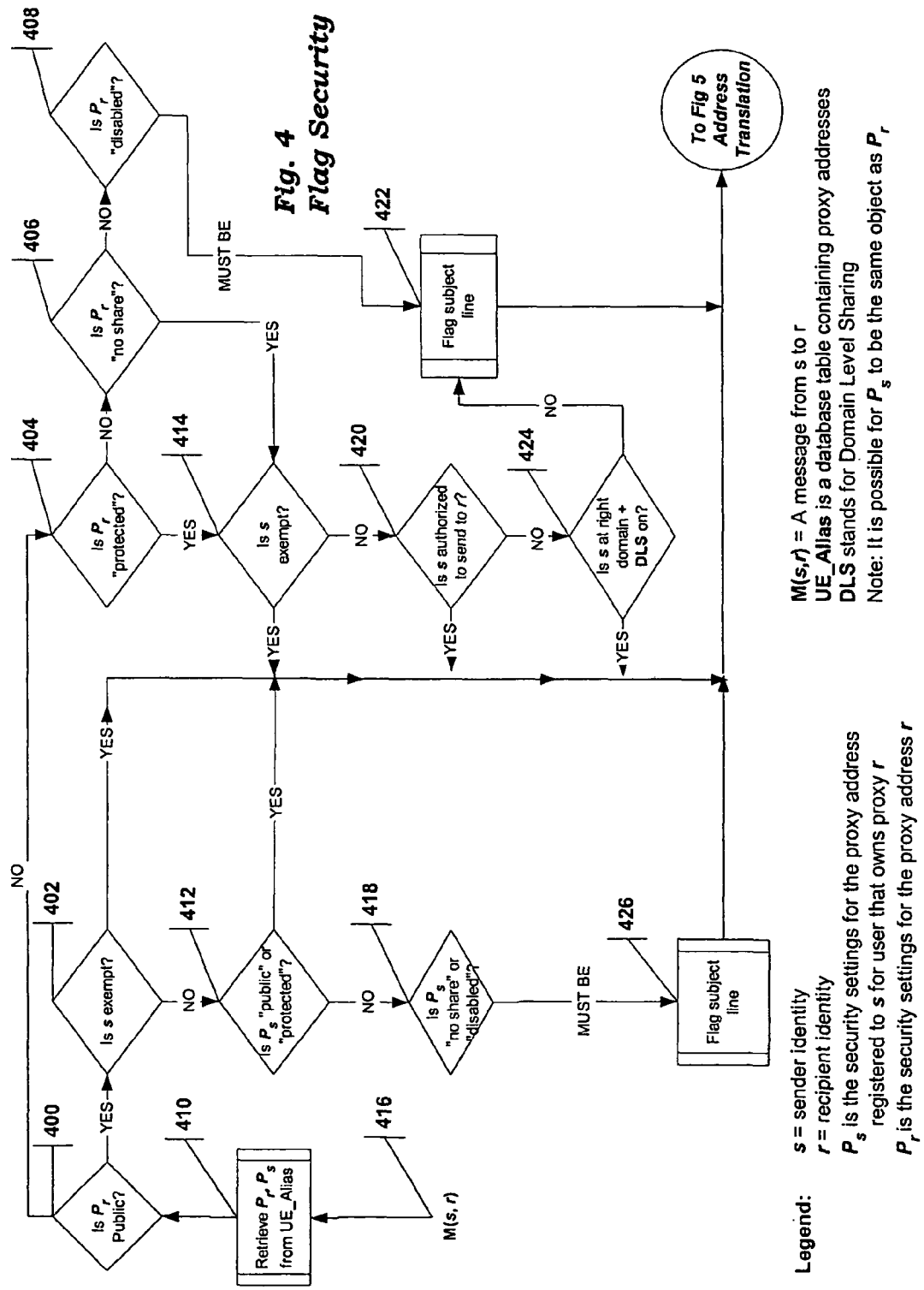

Fig. 5 Address Translations

500 "True" Identifiers (UE_True table)
T1 = Inside Identifier 1
T2 = Outside Identifier 1
T3 = Outside Identifier 2
T4 = Inside Identifier 2
Tn = Outside Identifier n s = sender identity
r = recipient identity
a = An address reference to translate
M(s,r) = A message from s to r

502 Proxy Identifiers (UE_Alias table)
$P_{(T2,T1)}$ = Substitute identifier for T1, registered to T2
$P_{(T3,T1)}$ = Substitute identifier for T1, registered to T3
$P_{(Tn,T1)}$ = Substitute identifier for T1, registered to Tn $P_{(Tx,Tx)}$ = Tx, registered to Tx 504

T(a) = Method that returns tranlation of address a for a message from s to r
$D_{(Tx,T1)}$ = Method that returns the proxy P that Tx uses to send e-mail to T1.
Sometimes $D_{(Tx,T1)} <> P_{(Tx,T1)}$

506

INBOUND, successfully past security, where:

508 — 1. a = r, s = T2, r = $P_{(T2,T1)}$, then T(a) = T1

2. a = r, s = T2, r = $P_{(T3,T1)}$, then T(a) = T1 —— 510

512 — 3. a = $P_{(T4,T4)}$, s = T2, r = $P_{(T2,T1)}$, then T(a) = T4

4. a = $P_{(T4,T4)}$, s = T2, r = $P_{(T3,T1)}$, then T(a) = T4 —— 514

516 — 5. a = T3, s = T2, r = $P_{(Tx,T1)}$, then T(a) = T3

6. a = $P_{(Tx,Ty)}$, s = T2, T2 is exempt, r = any P, then T(a) = Ty —— 518

OUTBOUND, no security on outbound, where:

520 — 7. a = r, s = T1, r = T2, then T(a) = $P_{(T2,T1)}$ 8. a = r, s = T1, r = T2, $D_{(T2,T1)} <> P_{(T2,T1)}$, then T(a) = $D_{(T2,T1)}$ —— 522

524 — 9. a = r, s = T1, r = T2, $D_{(T2,T1)} = P_{(T2,T1)}$, then T(a) = $P_{(T2,T1)}$ 10. a = r, s = T1, r = T2, r is exempt, then T(a) = $P_{(T1,T1)}$ [s] —— 526

528 — 11. a = T3, s = T1, r = T2, then T(a) = $P_{(T3,T1)}$ 12. a = T3, s = T1, r = T2, $D_{(T3,T1)} <> P_{(T3,T1)}$, then T(a) = $D_{(T3,T1)}$ —— 530

532 — 13. a = T3, s = T1, r = T2, $D_{(T1,T2)} = P_{(T2,T1)}$, then T(a) = $P_{(T3,T1)}$ 14. a = T3, s = T1, r = T2, T3 is exempt, then T(a) = $P_{(T1,T1)}$ [s] —— 532

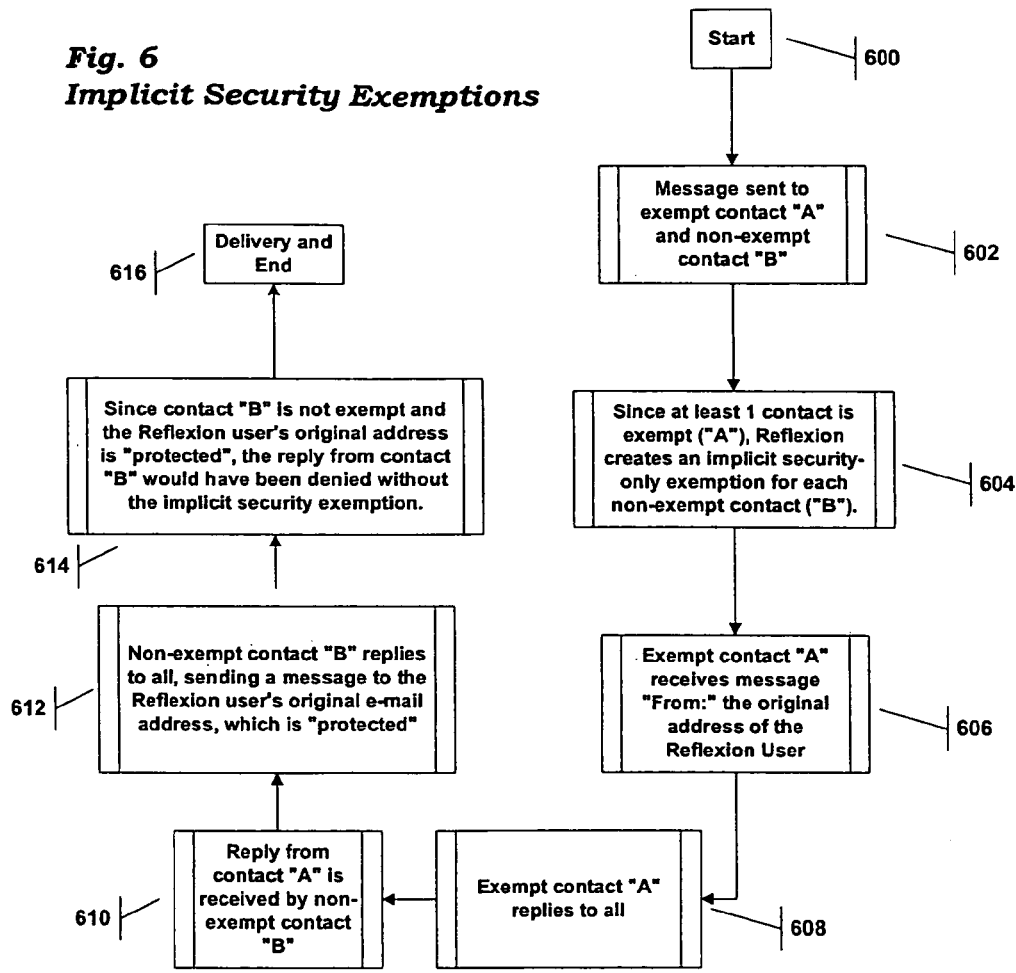
Fig. 6
Implicit Security Exemptions
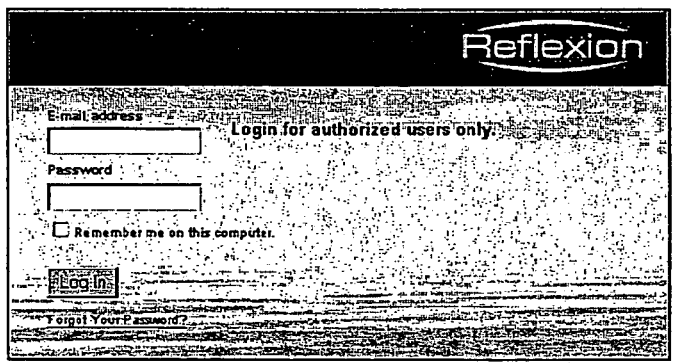
FIG. 7 Login Page

FIG. 8 Contacts List

FIG. 9 Contact Details Page

FIG. 10 Reflexion User Options Page

FIG. 11 Administrator Add a Global Exemption Page

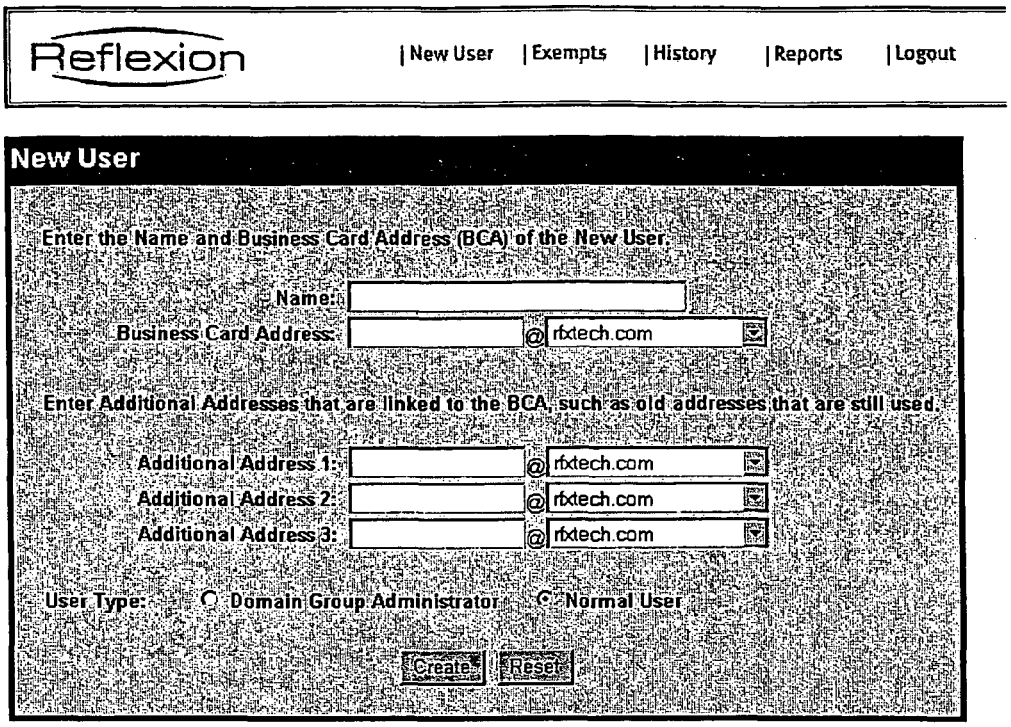
FIG. 12 Administrator Create New User Page

Name-on-the-Fly Address Creation

Adding a Footer to Inbound Messages

Removing a Footer from Outbound Messages

Cold Contact Anti-Virus

Lockdown Defense Against Viruses and Volume-based Attacks

SYSTEM AND METHOD FOR CONTROLLING ACCESS TO AN ELECTRONIC MESSAGE RECIPIENT

RELATED APPLICATION

This application claims the benefit of priority to U.S. Provisional Application No. 60/574,239, filed 25 May 2004, entitled "Systems and Methods for Controlling Access to an Electronic Message Recipient through the use of a Plurality of Proxy Identities".

TECHNICAL FIELD

This disclosure relates to computer networks and, more specifically, to a system and method for controlling access control over forms of electronic communications (e.g. "electronic mail", "instant messaging") where messages are directed between participants using sender and recipient identifiers.

BACKGROUND

The great strength of electronic mail ("e-mail") is the universal use of standard protocols that define the content and delivery of e-mail messages. Unfortunately, these standard protocols do not authenticate sender identities, making access control over e-mail a difficult proposition. In recent years, the lack of access control over e-mail has led to dramatic increases in the volume of commercial and other undesired messages ("spam").

For over ten years, there have been hundreds of attempts to create a software system to control access to e-mail inboxes.

At the time of this application filing, it is a widely held belief that existing anti-spam technologies fail to solve the spam problem in e-mail, to the extent that there are predictions that spam has put the medium in jeopardy of becoming unusable.

The most common approach is what is collectively known as "spam filtering". Spam filters attempt to determine whether or not a message is desired based on an assessment of its content, the identity of the sender, or some other characteristic of the message.

Filters tend to suffer from one or several common deficiencies. Filters frequently miss spam messages and allow their delivery and also incorrectly identify legitimate messages as spam ("false positive"). It's problem enough to miss significant numbers of spam, but blocking legitimate messages is simply intolerable for most users, especially in business where the filtered message could be of critical importance.

Filters are easily bypassed since the properties on which filters depend to identify spam are frequently under the control of the sender (e. g. sender's identity, subject, message content).

Rules-based filters require ongoing maintenance of the rules by users and administrators. Filters can be computationally expensive, as each message much be processed through all of the rules leading to latency in message delivery.

A second approach to limiting access over electronic communications is to deny all access other than from authenticated sources, a technique typically known as "white listing". It's a system that allows messages to arrive "by invitation only".

When a message is sent to a white list-protected e-mail address, the message is delivered only if the sender's identity is found on the white list. Messages from senders not on the white list are rejected, quarantined as suspect spam, or mostcommonly, challenged. Each rejection behavior introduces it's own aggravation and disruption to legitimate communications.

White listing works because most spam senders do not want to receive reply messages, so message-based challenges mostly arrive to legitimate message senders only.

Changes to the underlying e-mail protocols will not bring relief. The IETF (the body that defines and supports the RFC e-mail standards) already defined an authentication extension to standard e-mail communications in 1999 called ESMTP. Yet even though ESMTP has been with us for four years, few if any mail hosts require the use of ESMTP by senders because to do so would be to deny the vast majority of messages sent with universal non-authenticated standard (SMTP). So no one will move to the ESMTP standard until everyone does, resulting in a continued and permanent dependency on SMTP.

Commercial schemes that try to put a monetary control system (e. g. pay-per-message e-mail and bonded e-mail) over e-mail or that try to draw from legal intellectual property protection (e. g. trademarked poetry in message headers) require too much setup and follow-up aggravation to be acceptable to the majority of users.

The key insight that led to the present invention was accepting that it is very difficult, if not impossible, to design a system that separates all desired from undesired messages when mixed in a single collection. The numerous attempts that attempted to do so have not delivered complete protection against spam without blocking legitimate messages.

The solution resides in a system or method that can be adopted unilaterally by a user or enterprise that prevents desired and undesired messages from being mixed in the same collection.

SUMMARY OF THE DISCLOSURE

In accordance with an aspect of the disclosure, a system for selectively allowing or denying access to a user coupled to an electronic communications network includes a receiver that receives an inbound message over the electronic communications network from a sender. The inbound message includes an identifier that is associated with a sender and an identifier that is associated with a recipient. The system also includes a processor that determines if the identifier associated with the recipient was previously generated by the user and is absent from a plurality of proxy identifiers associated with the recipient. The processor is further determines one of at least three security states associated with the inbound message. A first security state is indicative of allowing delivery of the inbound message to the user. A second security state is indicative of denying delivery of the inbound message to the user. A third security state is indicative of conditionally allowing delivery of the message to the user. Each of the three security states are associated with the sender identifier and the recipient identifier included in the inbound message.

In one embodiment, the processor may be configured to add the identifier associated with the recipient to the plurality of proxy identifiers. Determining the recipient identifier was previously generated by the user may include isolating a portion of the recipient identifier to determine if the portion is included in the plurality of proxy identifiers. If the first security state is associated with the inbound message, the processor may remove the recipient identifier from the inbound message.

In accordance with another aspect of the disclosure, a system for selectively allowing or denying access to a user coupled to an electronic communications network by other users coupled to the electric communications network, includes a receiver that receives an inbound message over the electronic communications network from the sender user. The inbound message includes an identifier associated with the sender user and an identifier associated with a recipient user. The system also includes a processor or configured to determine pursuant to security settings dynamically alterable by said recipient user, and using the sender identifier and the recipient identifier, one of at least three security states to be associated with the inbound message. A first security state is indicative of allowing delivery of the inbound message to the recipient user. A second security state is indicative of denying delivery of the inbound message to the recipient user. A third security state is indicative of conditionally allowing delivery of the message to the recipient user. Each of the at least three security states are associated with the sender identifier and the recipient identifier included in the inbound message. If delivery is allowed pursuant to the determined security state, the processor is further configured to add a user interface to the inbound message. The user interface is configured to serve as an interface for the recipient user, permitting the recipient user to alter security settings associated with the recipient user.

In one embodiment, the footer may include information contained in the inbound message. The footer may include information representing the security state associated with the inbound message. The processor may be configured to adjust the footer for updating information represented by the footer. The processor may also be configured to adjust the footer for updating information represented by the footer, wherein the user initiates the adjustment. Based on the determined security state, the processor may delay delivery of the inbound message.

In accordance with another aspect of the disclosure, a system for selectively allowing or denying access to a user coupled to an electronic communications network includes a receiver that receives an inbound message over the electronic communications network from a sender. The inbound message includes an identifier associated with a sender and an identifier associated with a recipient. The system also includes a processor configured to determine one of at least three security states associated with the inbound message. A first security state is indicative of allowing delivery of the inbound message to the user. A second security state is indicative of denying delivery of the inbound message to the user. A third security state is indicative of conditionally allowing delivery of the message to the user. Each of the at least three security states are associated with the sender identifier and the recipient identifier included in the inbound message. The processor is also configured to determine if the inbound message is exempt from the security states and to deliver the inbound message based on the security exemption.

In one embodiment, the security exemption may be based on the identifier associated with the sender. The security exemption may be based on a domain associated with the recipient identifier. The security exemption may be based on the recipient identifier and the sender identifier including a similar domain. The security exemption may be based on the inbound message being a reply message to another message that was sent to exempt and non-exempt recipients. The security exemption may be valid for a time period. The processor may be further configured to store data that represents the delivery of the inbound message.

In accordance with another aspect of the disclosure, a system for selectively allowing or denying access to a user coupled to an electronic communications network includes a receiver configured to receive an inbound message over the electronic communications network from a sender. The inbound message includes an identifier associated with a sender and an identifier associated with a recipient. The system also includes a processor configured to determine one of at least three security states associated with the inbound message. A first security state is indicative of allowing delivery of the inbound message to the user. A second security state is indicative of denying delivery of the inbound message to the user. A third security state is indicative of conditionally allowing delivery of the message to the user. Each of the at least three security states are associated with the sender identifier and the recipient identifier included in the inbound message. Determining the security state includes determining when a previous message was received that included the identifier associated with the sender and the identifier associated with the recipient.

In one embodiment, the processor may also be configured to deliver the inbound message if the time period between reception of the inbound message and the previous message is less than a predefined time.

In accordance with another aspect of the disclosure, a system for selectively allowing or denying access to a user coupled to an electronic communications network includes a receiver that receives an inbound message over the electronic communications network from a sender. The inbound message includes an identifier associated with a sender and an identifier associated with a recipient. The system also includes a processor configured to determine one of at least three security states associated with the inbound message. A first security state is indicative of allowing delivery of the inbound message to the user. A second security state is indicative of denying delivery of the inbound message to the user. A third security state is indicative of conditionally allowing delivery of the message to the user. Each of the at least three security states are associated with the sender identifier and the recipient identifier included in the inbound message. The processor is also determines if the security state associated with the inbound message has been escalated.

In one embodiment, if the security state is escalated and the inbound message is associated with the first security state, the processor may associate the second security state with the inbound message in place of the first security state. If the security state is escalated and the inbound message is associated with the first security state, the processor may associate the third security state with the inbound message in place of the first security state. The security state escalation may be occur for a predefined period of time. Determining if the security state has been escalated may include detecting a predefined condition. Determining if the security state has been escalated may include receiving an instruction from a system administrator.

Additional advantages and aspects of the present disclosure will become readily apparent to those skilled in the art from the following detailed description, wherein embodiments of the present invention are shown and described, simply by way of illustration of the best mode contemplated for practicing the present invention. For example, along with describing a system, methodologies and computer product implementations (e.g., a computer program product stored on a non-transitory computer readable medium) are described in the disclosure. As will be described, the present disclosure is capable of other and different embodiments, and its several details are susceptible of modification in various obvious respects, all without departing from the spirit of the present disclosure. Accordingly, the drawings and description are to be regarded as illustrative in nature, and not as limitative.

BRIEF DESCRIPTION OF THE DRAWINGS

FIG. 1 is a block diagram representing an architecture of an electronics communication system.

FIG. 2 is a flowchart representing how the database is populated from e-mail traffic and other preliminary steps followed prior to enforcement of the security module.

FIG. 3 is a flowchart representing the logic and behavior of the Security Module of the product is operated in Enforce Mode.

FIG. 4 is a flowchart representing the logic and behavior of the Security Module when the product is operated in Flag Mode.

FIG. 5 is a table of formulas that represent the various address translation results depending on the context of messages (i.e., who is sending the message, using what proxy, and to whom) and various security settings.

FIG. 6 is a flowchart that represents operations of Implicit Security-Only Exemptions.

FIG. 7 is a graphical user interface that includes a Login Page.

Figures 8, 9:
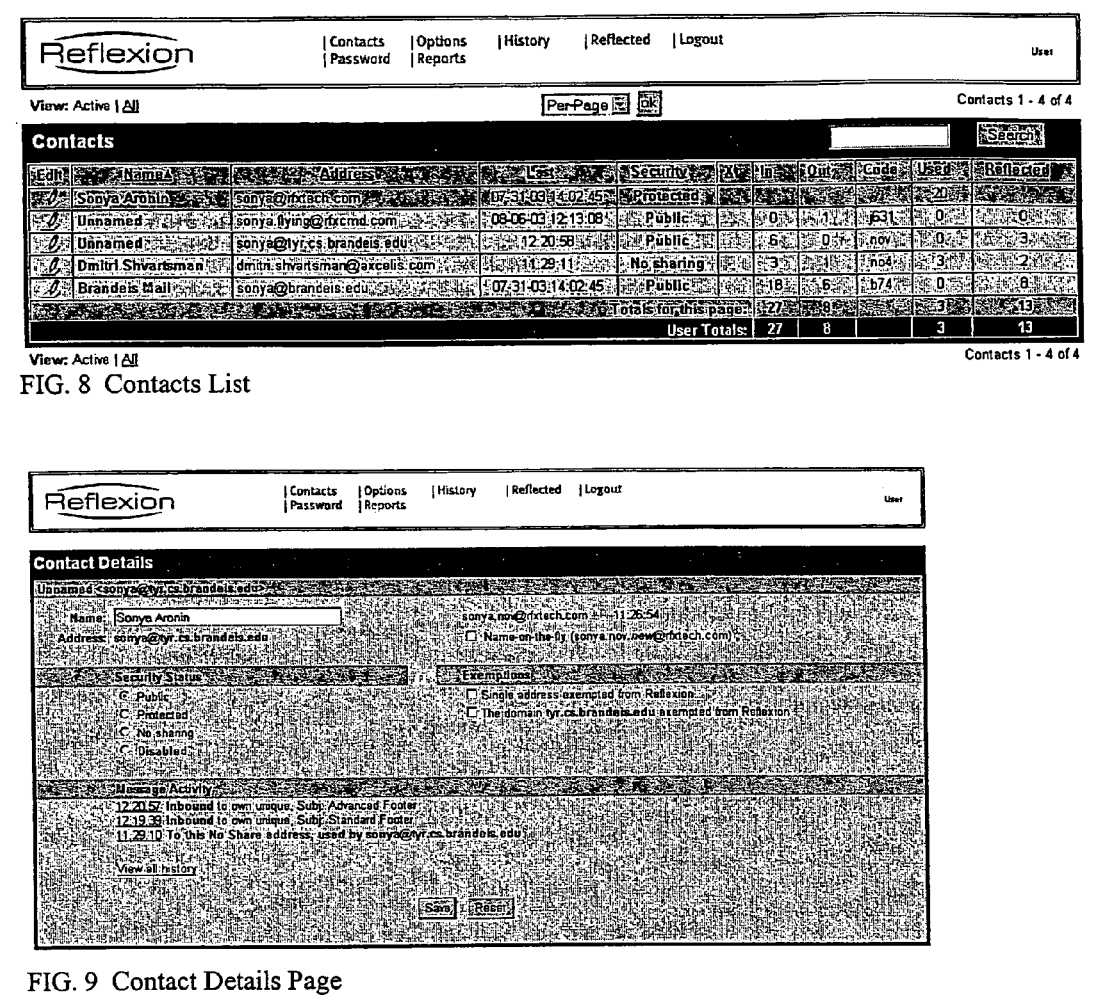

FIG. 8 is a graphical user interface that includes a Contact List.

FIG. 9 is a graphical user interface that includes a Contact Details Page.

Figures 10, 11:
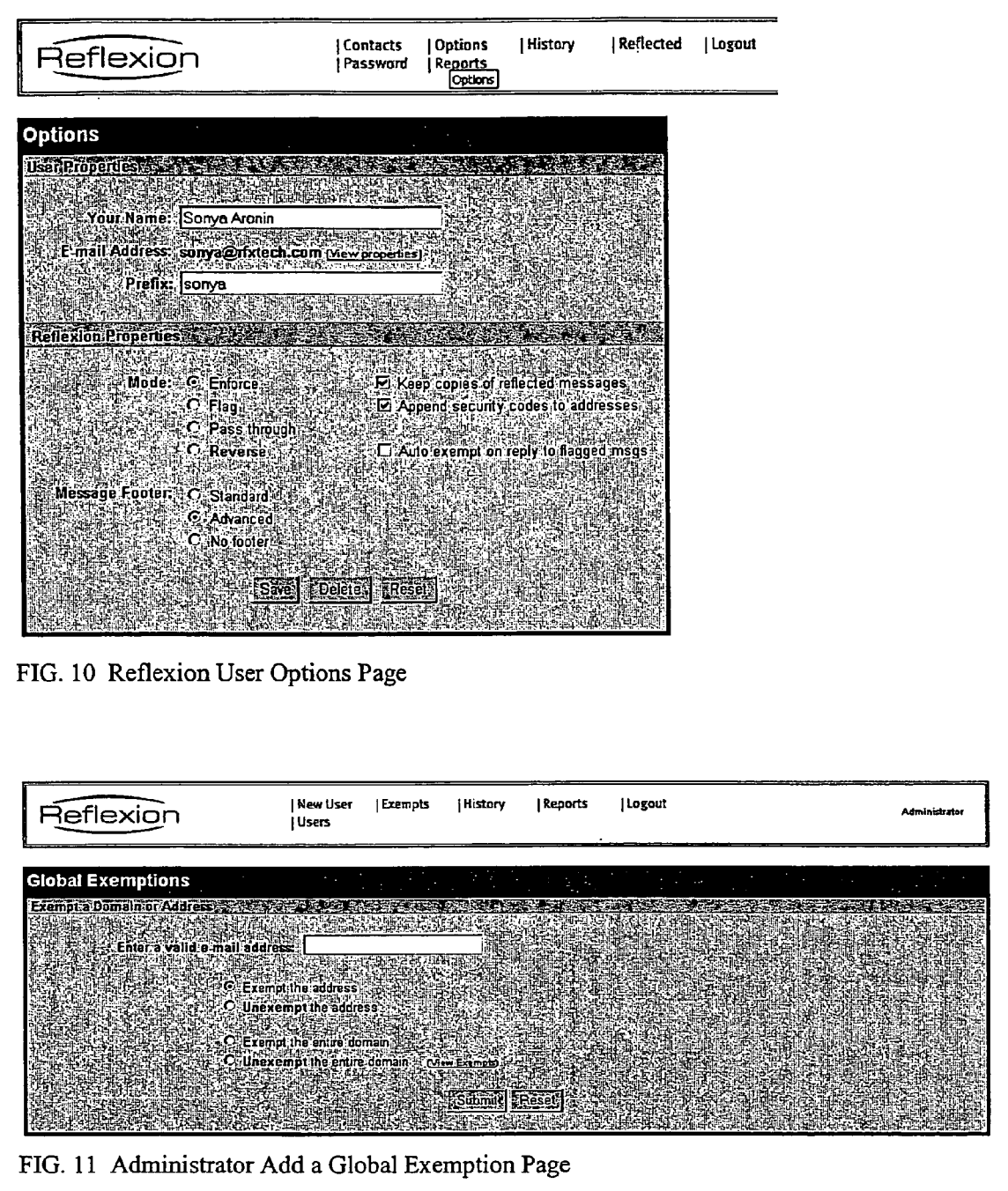

FIG. 10 is a graphical user interface that includes a Reflexion User Options Page.

FIG. 11 is a graphical user interface that includes an Administrator Add a Global Exemption Page.

FIG. 12 is a graphical user interface that includes an Administrator Create New User Page.

DETAILED DESCRIPTION OF THE EMBODIMENTS

Figure 13:
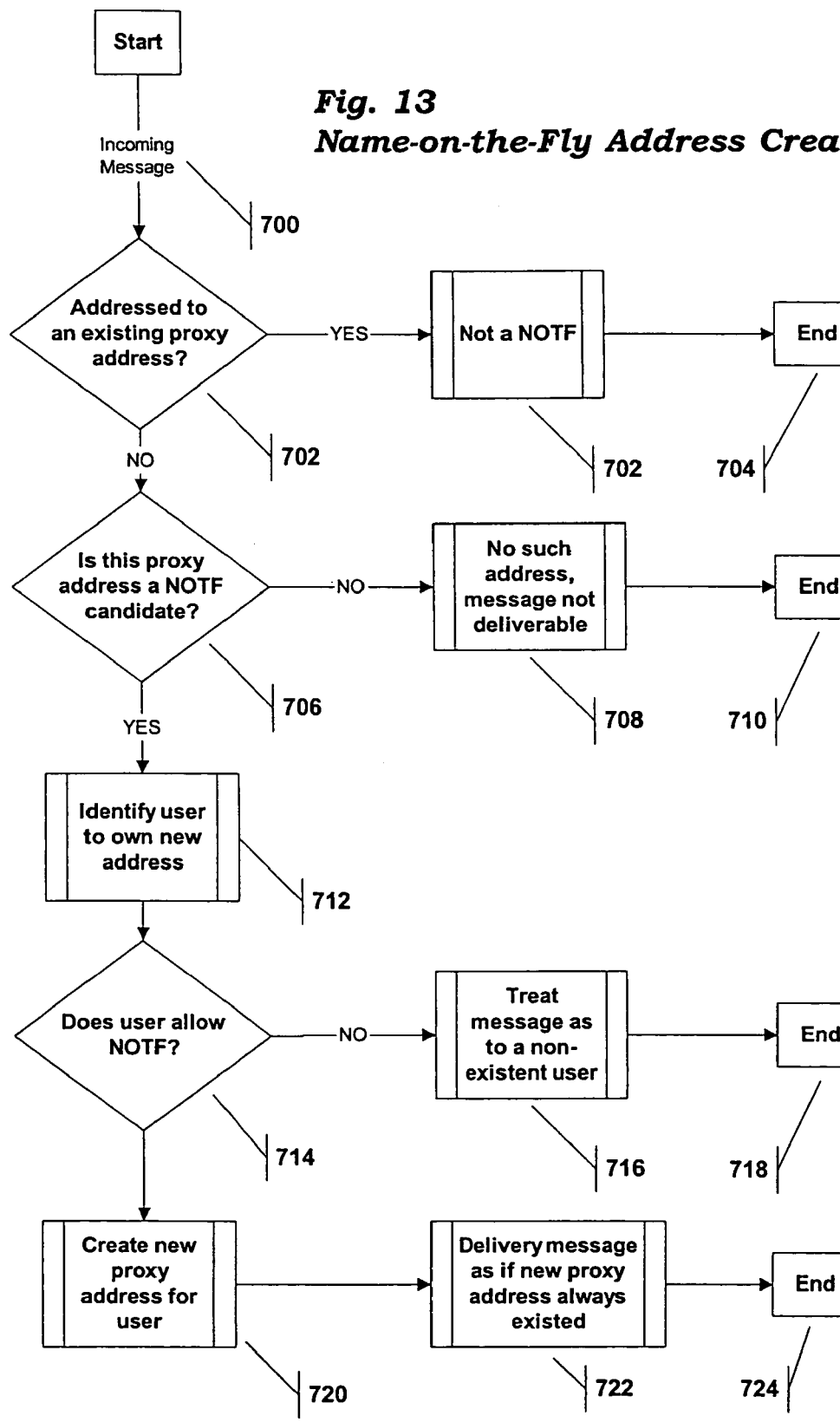
FIG. 13 is flowchart that represents operations for Name-on-the-Fly Address Creation.

The present invention (the "product") provides systems and methods for controlling access in forms of electronic communications (e. g. "electronic mail", "instant messaging") where messages are directed between participants using sender and recipient identifiers, through the establishment and management of a plurality of proxy identifiers ("the proxies") that serve as substitutes to a protected original identifier ("the originator"), each of which proxies having a discrete security state defining access rights that correspond to the portion of the messaging community dependent on it for communications with the originator ("the contacts").

Typically, there are at least three security states, and in many embodiments many more than three, that control the manner in which proxy identifiers (e. g. e-mail addresses) are restrictive of access to the destination identifier during the delivery of messages, are created, and are substituted for references to the source identifier in the message.

The system may support multiple (i.e., more than three) security settings that collectively interact with each other, resulting in a matrix of discrete security states and corresponding behaviors. The diversity of security states in this embodiment provides system behavior that is more precise than, for example, a binary state system where access is either allowed or disallowed. In this and other embodiments, certain communities of users can be permitted access where others cannot, even in messages sent to the same destination identifier. For access control, messages can be denied, challenged, quarantined or accepted, and each with variations.

Proxy e-mail addresses may be defined in a variety of manners, including automatic creation and assignment by the product as messages are processed through the system, explicit creation and assignment by the enterprise or individual user, and implicit creation following a naming convention that predetermines the source e-mail address and initial security state.

References to proxy e-mail addresses can be either translated or not translated to the corresponding source address, depending on the security state. For example, references to proxy identifiers that were created automatically by the product are replaced by the source identifier throughout the message. Explicitly created proxy addresses or defined via a naming convention (and are thus known to the user) are not replaced by the source identifier.

The product is comprised of three systems: a Reflexion Mail Server (RMS), a Administration Web Site (AWS), and a Database server.

The three systems can reside on a single server or be clustered in a variety of configurations on multiple servers.

Typically most external messages to and from the originator pass through the product. Messages from the originator to an external recipient ("contact") are herein called "outbound messages"; messages from an external sender (also a "contact") to the originator are herein called "inbound messages".

The Reflexion Mail Server ("RMS") employs two storage queues, one in which in-bound traffic messages reside until the Security Module processes them (the "pre-processed queue"), and a second wherein processed messages and bounce messages are placed for final delivery (the "delivery queue").

The sender and recipient e-mail addresses specified in the transport envelope of the SMTP delivery are the keys for the Security Module. The Security Module determines, based on a combination of interacting security states as defined hereinafter, whether or not the message should be delivered to the intended recipient. A variety of error messages and warnings can be sent back to the sender if warranted.

Messages that are delivered typically have a footer attached to the bottom of the message by the RMS with a link to the Reflexion Wizard, a polymorphic browser interface that serves as the user's primary interface to the product.

The Reflexion Mail Server also manages the creation and use of the arrays of proxy identifiers that is the core security apparatus of the invention.

Proxy Addresses

Each contact is assigned one or more proxy addresses, each of which is a RFC-compliant e-mail addresses (i.e., addresses compatible with naming conventions of the most common e-mail protocols,). In the context of this application, "proxy identifier" is synonymous with "proxy address".

Each contact is assigned its own proxy address on first reference as either the sender or recipient in a message passing through the RMS. The product controls access to the infrastructure based on enterprise and user preferences and defaults, stored as properties on each security code.

Following a message from an originator to an external contact:
1. An outbound message is processed through the existing e-mail infrastructure of the host enterprise and arrives at the product embodying the invention.
2. The product automatically assigns and records a unique proxy address as being registered for use by the contact. If a proxy address had previously been assigned to the contact, it will be reused.
3. All references to the originator's address in the header and body of the outbound message are changed to corresponding proxy address. For example, a message from the originator address:
   From: ssmith@company.com
is sent to an outside contact. As the message passes through the product, all references to the originator address ssmith@company.com are changed to the proxy address that corresponds to the recipient, which in this example is:
   From: ssmith.123@company.com
When the message arrives in the contact's inbox, the message appears to have originated from the address ssmith.123@company.com (emphasis on the ".123"), not from ssmith@company.com.
In this example, the proxy address remains personalized to the originator's identity; the local part still has "ssmith" and the domain remains "company.com". In other embodiments, the proxy address could just as easily sustain no visible provenance from the originator address. For example, an address such as 123@company.com can be assigned as the proxy address to ssmith@company.com. In still another example an address such as 123@321.com can be assigned as the proxy address for ssmith@company.com. Typically each proxy address is unique with respect to the other proxy addresses such that each proxy address is distinguishable from the other proxy addresses.
4. After altering references of the originator address to be the proxy address, the message is delivered as with any unaffected e-mail message.

Following a message sent from an external contact back to the originator via a proxy address:
1. An outbound message is sent to the proxy address by an external contact that ultimately arrives at the RMS.
2. The RMS Security Module determines the delivery disposition for the message based on the security state of the addresses involved, including but not limited to:
   a. Message delivery denied, message offering no recourse to sender. End processing.
   b. Message delivery denied, message offering new proxy to sender. End processing.
   c. Message delivery accepted, message flagged as "suspect". Proceed to 3.
   d. Message delivery accepted without reservation. Proceed to 3.
3. For messages authorized for delivery, all references to proxy addresses in the header and body of the inbound message are changed to corresponding originator's address. To continue the example, a message to the proxy address:
   To: ssmith.123@company.com
When the message arrives in the contact's inbox, the message appears to have been sent from the external contact to the originator's address ssmith@company.com.
In this manner, proxy addresses on inbound messages are not exposed in the final delivery, making the mechanics of the access control protocol transparent to the user.

Users can disable or restrict the use of one security code without affecting any other.

Access control is difficult to circumvent because the security settings reside on the e-mail address itself, so it doesn't matter who the sender says that they are, or what they place in the message, the address itself will no longer work once disabled.

About the Administration Web Site

The Administration Web Site ("AWS") provides a full-control, full-disclosure interface to the proxy arrays, security settings and traffic history.

The AWS is built on a three-tier architecture:
1. Java Server Pages and Servlets
2. Database Server
3. Application Server The server pages define the application interface, update and request data from the Database Server, and construct result pages and forms that are served to the user's browser by the Application Server.

Within the interface defined in the server pages and servlets, there are a number of application-specific objects.

Users

Access to the overall AWS requires success authentication of the user's credentials. In the preferred embodiment, the AWS requires a successful login using a user ID and corresponding password.

Authentication and credential requirements are enforced on every page within the AWS.

There are three levels of users supported in the AWS, each having different access privileges:
1. Super Administrator—full access and the only user type that can access the server configuration and control methods. Access to overall traffic history details and summary.
2. Domain Group Administrator (DGA)—full access to the domain group itself, the users of the domain group, and the traffic history for domain group to which the DGA is assigned.
3. User—Access to the user's own options, proxy addresses and personal history.

Property—Description

Login ID Name or e-mail address used during login to the Administration Web Site Password Password used during login to the Administration Web Site Mode Reflexion has different overall security modes by user:
1. Enforce—Denial and challenge messages are sent to senders when their messages cannot be delivered
2. Flag—Guarantees that all messages are delivered to the recipient. Messages that would be denied or challenged in Enforce Mode are instead "flagged" (i. e. given a visible indicator that the message would not have been delivered in Enforce Mode.
3. Pass Through—Messages to the recipient are to skip the Security Module altogether and go straight to delivery.
4. Reverse—Used to eliminate the dependency on proxy addresses, ostensibly in preparation for removal of the product. All security is dropped, and any message to a proxy address results in a request message being sent to the sender requesting that future messages to the recipient be sent on the original address. Messages are flagged on messages sent to a proxy address.

Footer As messages pass through the product, the RMS attaches a footer to the bottom of each message. There are three types of footers available to each user:

1. Standard Footer—Contains single link that connects to the Reflexion Wizard.
2. Advanced Footer—Contains a great deal of additional information and links not found in the Standard Footer.
3. No Footer—The Footer is not required; this type turns it off.

Message Store Option to keep copies of messages that denied or challenged.

Auto-exempt Option to automatically exempt contacts when the user replies to a flagged message from the contact.

The Server

The Server object contains properties and methods that are specific to the entire installation of the product. The server object is available only to users with "super administrator" privileges.

Most of the properties are related to the behavior of the product as a generic mail server. These include settings for the queue lifetime, IP address of the Administration Web Site, database backup schedules, etc.

Domain Groups

Each Reflexion installation can support any number of enterprises. Enterprises are managed as a Domain Group on the product. A Domain Group can have any number of domains under management, any number of users with addresses at these domains, and any number of Domain Group Administrators (DGAs) managing the Domain Group.

Contacts

Reflexion catalogs all of the external contacts that either sent or received a message to or from the user. A contact is both a proxy address with security settings and a security profile of the contact to which it is registered.

Property—Description

Contact Name Name of the contact to which this contact's proxy address is registered. The Contact Name is parsed from inbound messages from the contact.

True Address The contact's e-mail address (not to be confused with the proxy address assigned to the user).

Proxy Address The Reflexion proxy address assigned to the contact by the RMS.

Security Status Each proxy address has one of the following security status:
1. Public—This proxy can be used and shared by anyone and messages to it will be delivered.
2. Protected—Only "appropriate" contacts can use this proxy address, inappropriate contacts will be challenged (Enforce Mode) or their messages will be flagged (Flag Mode).
3. No Share—Only "appropriate" contacts can use this proxy address, inappropriate contacts will be denied (Enforce Mode) or their messages will be flagged (Flag Mode).
4. Disabled—No mail to this proxy address will be delivered (other than for exempt senders).

Message Store Option to keep copies of messages that denied or challenged.

Auto-exempt Option to automatically exempt contacts when the user replies to a flagged message from the contact.

Name-on-the-Fly If enabled, allows new proxy addresses to be defined "on the fly" (i. e.

(NOTF) without any interaction with the product) that are derivatives of this contact's proxy address. For example, if the proxy address of this contact is:

proxy@company.com and NOTF is on, then the user can invent any new proxy address of the form:

proxy.new@company.com where "new" is anything that the user wants. The NOTF proxy will be assigned to the first contact that uses it (see FIG. 13 to follow).

Life Span Proxy addresses can be assigned a limited life span. When a proxy "expires", the security state is set to disabled.

Exemptions

Reflexion supports database entries that serve to identify sender addresses that should not be subject to security enforcement. There are four explicit exemptions that can be set by individual or enterprise users of Reflexion. Exemptions for e-mail are included, but the technique can be applied to any form of electronic communications:
1. Exempt a single sender identifier (e-mail address) for a single Reflexion user.
2. Exempt an entire host and domain (e. g. "company.com") for a single Reflexion user.
3. Exempt a single sender identifier (e-mail address) for all users at an enterprise
4. Exempt an entire host and domain (e. g. "company-.com") for all users at an enterprise For each message sent to or received by a remote party (i. e. a sender whose address is not local to the protected enterprise), a match of the sender's address with any of the four corresponding exempt categories listed above will result in the party being treated as "exempt".

An exempt sender is not subject to Reflexion security, which means that by being exempt, all messages from an exempt sender will be delivered. Messages to an exempt recipient will inhibit the use of a Reflexion address.

The primary use of explicit exemptions in Reflexion is to insulate a remote party that is already dependent on the original address from having to change their behavior or the e-mail address used to reach the Reflexion user, specifically when a Reflexion user begin using the application with a pre-existing spam problem.

The process by which a Reflexion user stops a pre-existing spam problem is as follows:
1. Increase security on the original e-mail address, typically raising the security state from "public" to "protected".
2. The known e-mail addresses and domains of legitimate contacts are exempted, allowing those contacts to continue using the original address unabated.
3. Security enforcement is set to "flag mode" to guarantee that all messages arrive to the user.
4. The user adds legitimate contacts that are not on the exempt list (i. e. whose messages arrive "flagged") to the exempt list.
5. When the Reflexion user believes that all legitimate contacts are on the exempt list, and all flagged messages are undesired, they may elect to change security enforcement to "enforce mode", after which time addresses and host and domains will rarely need to be added to the exemption list.

The system also allows users to move contacts away from being exempt. As an option, each user or enterprise can instruct Reflexion to send a polite request to exempt contacts that they should change their e-mail address for the user to a unique proxy address, triggered by the arrival of a message from the exempt contact. When a message arrives at the recommended proxy address, the exemption status is cleared for that contact.

There is an implicit contact supported by Reflexion. On any message sent by the Reflexion user to two or more external contacts, where at least one of the contacts is exempt and one of the contacts is not exempt, the non-exempt contact(s) will have an implicit security-only exemption recorded for their address(es) by the application. This implicit exemption allows non-exempt users to bypass security on inbound messages (but will not inhibit the use of unique proxy addresses on outbound messages to them). See FIG. 6 for an example of why and how implicit security-only exemptions are supported in the application.

History

The product records descriptive information about each message that is sent in or out of the enterprise. The individual message history items are consolidated into totals for historical summary reporting and dropped after remaining online for a configurable length of time.

Referring to FIG. 1, the Reflexion Mail Server employs 2 e-mail queues, one queue for in-bound traffic wherein messages reside until the Security Module processes them (the "pre-processed queue") 102, and a second queue wherein processed messages and bounce messages are placed for final delivery (the "delivery queue") 106.

Inbound messages (from either the mail server of the enterprise 100 or the mail server of the external contact 114) are received and stored in the inbound queue 102. Inbound messages from external sources 114 are subject to the product's security.

Security enforcement takes place during receipt of the inbound messages using the SMTP protocol 112. As soon as the transport envelope sender and recipient addresses are received, the SMTP protocol handler sends a request to the Reflexion Security Module 110 to obtain the security disposition for this message 116. Subsequent processing of the remainder of the incoming message is predicated on the security response 118 returned from the Reflexion Security module 108.

If the message can be delivered, it is deposited into the pre-processing queue 102. If the message cannot be delivered, either a deferral or denial 120 will be sent back to the sending server 114.

Messages that are subject to deferral are only deferred for some amount of time (typically 30 to 60 minutes). This is a test that the sending server 114 is "well-behaved". Many servers that send spam do not process deferred messages, thus deferred messages will not be resent from such sources.

Using a typical queue scheduler, each inbound message is processed by the product's Message Translation module 104, which deposits into the delivery queue 106 either:

1. the message "as is", or
2. the message with some level of additions, modifications or other translation, to be described hereinafter The delivery queue 106 will deliver inbound messages to the internal e-mail infrastructure 100 of the enterprise or to an external destination 114. The delivery queue can use standard destination lookup mechanisms to resolve delivery locations (such as Domain Name Service DNS) or a routing table that sends mail to known internal domains to the internal e-mail infrastructure 100 and everything else to the Internet 114.

Referring to FIG. 2, inbound message preparation is described. As the product processes mail, it updates the database with new proxy addresses, volume statistics and historical tracking. FIG. 2 details the database preparations that are made during the receipt of an inbound message in the preferred embodiment.

Inbound message preparation takes place before the security disposition is returned on a given message.

Typically, the first thing that is examined on an incoming message is whether or not the recipient address is at a domain that is being protected by Reflexion 200.

Note that a message that arrives at Reflexion must either be sent to an address whose domain is being protected by Reflexion ("inbound"), or be sent from such an address ("outbound"). Local mail should be delivered locally; therefore Reflexion should never see e. mail to and from addresses at the same domain.

It is possible for mail to be sent from one enterprise to another and have both enterprises' domains be hosted on a single Reflexion installation. In this case, the message is first processed as an outbound message from the first enterprise and then is treated as an inbound message to the second enterprise.

If the sender's address has never been encountered by this installation of Reflexion 202, it is added to the database table of "true addresses" 204.

Next, the product searches the database to see if the recipient address is an issued proxy address 206.

If the alias does not exist, it is still possible that the address was created through the naming convention known as, "Name-on-the-Fly" (NOTF) 210, in which case the proxy address should be created and registered to the protected user based on information drawn from the naming convention 212. If NOTF is not permitted for the unknown proxy address, the message is rejected 208 (see FIG. 13 to follow for more information on NOTF).

At this point, the proxy address exists in the database. Start tracking the result of the message for the history system 220.

To find the user for which the proxy serves as a substitute, it's necessary in the preferred embodiment to navigate first to the user's original address 218 then from there to the user records 216. In other embodiments, this can be accomplished using numerous other strategies, however, it is necessary to have in hand the identity of the user in order to proceed.

If the proxy address is unregistered to any given user 214, then register it to the current sender 222. This condition can occur due to two possible conditions. First, the proxy address was just created using NOTF, and is thus un-owned. Second, proxy addresses can be explicitly created prior to being used, in which case it is un-owned until the first use, and wherein it becomes registered to the first user 222 just as with NOTF proxies.

The sender's exemption status is then checked 224 to provide information to the Reflexion Security Module and also the Address Translation Module. Exempt senders are not subject to access control and all mail to and from exempt contacts are conducted under the original internal address of the protected user.

Referring to FIG. 3, security enforcement is described. Once inbound message preparation is completed, Reflexion will determine the security disposition for this message.

There are two active security modes available to Reflexion users; Enforced Mode and Flag Mode.

FIG. 3 details the logic followed by the preferred embodiment security model for messages sent to a user that employs Enforced Mode.

By definition, all inbound mail to domains protected by Reflexion are proxy identifiers, even if the recipient address is indistinguishable from the original, internal address. Each original, internal address has a proxy address with the same address in order to permit security to be placed on the original address itself.

The security state of the recipient address is interrogated first.

Message to a Public Proxy

If the recipient proxy address has a security status of "public" 300, then check for the sender's exempt status 302. If the sender is exempt, security is bypassed and the message is passed on to subsequent message translation stages and delivered 338.

If the proxy address that is registered to the sender is not the same as the proxy address used as the recipient address for this message (this is not stated clearly in the figure, but is the case), the product will examine the security set on the proxy of the sender before permitting delivery.

If the proxy assigned to the sender is public 312 or protected 320, the message is allowed through security 338. The sender is sent a reminder message to use their own proxy address in the future 322 if the proxy that is registered to them is protected.

If the sender's proxy is "no share" 328, the message is not allowed to be delivered. Instead, the sender is sent back a request that the sender resend the message using the proxy address registered to the sender (as opposed to proxy used as the recipient in this message).

So even if a message is sent to public proxy address, the security state of the sender's proxy address can alter, or prohibit, the delivery of the message.

Message to a Protected Proxy

If the recipient proxy address has a security status of "protected" 304, then check to see if the sender is permitted to send mail to this proxy address.

Currently, there are three ways that a sender can be authorized to use a protected proxy. First, if the sender is exempt 314 then security is bypassed and the message is passed on to subsequent message translation stages and delivered 338. Second, if the sender is the party that is registered to the proxy address 324, delivery is authorized and completed 338. Finally, if the sender is from the same domain as the contact that is registered to the proxy address and the domain is not one of the major ISPs such as AOL, Yahoo, Hotmail, etc. (a configurable list), and the security property that permits domain-level sharing is enabled on the proxy 332, the message is authorized for delivery 338.

Senders that are not authorized to use a protected proxy are sent a request that the message be resent to the proxy address that is permitted for use by the sender 316. This message essentially states that "proxy address x has been changed to the sender's proxy address y. Please resend your message to y".

Protected addresses are used to protect against spam that has no valid return address, but to afford legitimate contacts a resend mechanism that will let messages be delivered.

Message to a No Share Proxy

If the recipient proxy address has a security status of "no share" 306, then check to see if the sender is permitted to send mail to this proxy address.

Currently, there are three ways that a sender can be authorized to use a protected proxy. First, if the sender is exempt 314 then security is bypassed and the message is passed on to subsequent message translation stages and delivered 338. Second, if the sender is the party that is registered to the proxy address 324, delivery is authorized and completed 338. Finally, if the sender is from the same domain as the contact that is registered to the proxy address and the domain is not one of the major ISPs such as AOL, Yahoo, Hotmail, etc. (a configurable list), and the security property that permits domain-level sharing is enabled on the proxy 332, the message is authorized for delivery 338.

Senders that are not authorized to use a protected proxy are sent a denial of delivery message that gives no recourse for resending the message. 316. The difference between unauthorized use of a protected address versus unauthorized use of a no share address is that protected proxy denials provide a means for successfully resending the message while no share denials do not.

With no share proxies, the requirement to successfully send an e-mail message is raised from simply knowing the recipient address to knowing both the recipient and the corresponding sender address that is registered to the proxy. No share proxies provide security-conscious organizations a very effective yet lightweight protection against what are known as "directory harvest attacks". Directory harvest attacks are a technique used to gather live e-mail addresses by sending messages to large numbers of different addresses at the targeted domain. Whatever addresses do not result in a "no such user" are assumed to be valid.

With no share proxies, directly harvests will fail unless the sender knows to spoof the correct sender's address in each attempt.

Message to a Disabled Proxy

If the recipient proxy address has a security status of "disabled" 308, then check to see if the sender is exempt, for that is the only way that a message to a disabled proxy can be delivered if the user employs Enforce Mode security.

Referring to FIG. 4, flag security is described. In particular, the details the logic followed by the preferred embodiment security model for messages sent to a user that employs Flag Mode.

Flag Mode guarantees that all inbound messages will be delivered to the user's inbox.

The logic is almost the same as described for FIG. 3, the only material difference is that, in Flag Mode, whenever a sender is determined to be unauthorized to send a message to the recipient proxy, instead of sending a denial or retry message as would occur in Enforce Mode, the product will only flag the subject line with a prefix to indicate that the sender is unauthorized to send this message to the chosen proxy address 422/426.

It's important to note that the subject line flag is visible only inside the host enterprise; Reflexion removes the flag on replies to flagged messages on the way out of the enterprise.

Flag Mode serves three important product requirements:
1. Provides new users with a mode of operation for a smooth migration into using Reflexion, guaranteeing that no outside contact will ever be aggravated by Reflexion ("transition"). Pre-existing spam problems are cleared up in the new user's transition period.
2. Provides users with little or no tolerance for the blocking of legitimate but unexpected messages a guarantee that all mail will be delivered to the user's inbox. Flag Mode is ideal for those in the role of sales, business development or executive positions where a lot of business cards are handed out and the value and frequency of unexpected messages is high.

Users that do not or cannot change their e-mail behavior will operate the product permanently in Flag Mode. These users (or their administrator) can also inhibit the use of proxy addresses altogether, allowing the user to continue to use their one and only address as normal, yet still receiving spam relief.

Stopping a Pre-Existing Spam Problem

A new user that begins using the product, who has a pre-existing spam problem, can end spam being sent to the existing address in the following manner:

1. Configure overall security enforcement to Flag Mode.
2. Exempt all known contacts using any of the various embodiments of exemption methods. Exempting contacts allows legitimate contacts that are already dependent on the original, internal address to continue to use it unabated.
3. Increase security on the proxy that has the same address as the original, internal address. This will cause any mail sent to that proxy to be flagged unless the contact is on the exempt list. This is a non-aggressive form of "white listing", a common technique that is very effective at blocking spam but which has shortcomings that limit wide scale adoption, particularly among businesses.

Reflexion only employs this white list to stop a pre-existing spam problem. If a new user does not start with a spam problem, the white list is not required.

Referring to FIG. 5, address translations are described. Once an inbound message has been successfully cleared for delivery, most references to proxy addresses are translated to the corresponding original, internal addresses. There are some security states in the preferred embodiment that inhibit the translation of proxy addresses, specifically Name-on-the-Fly proxies (see FIG. 13 for more information on NOTF).

NOTF proxies were defined by the user and, as such, reside in the name space of the user. Many times, NOTF proxy addresses are used in a login sequence or other process keyed by the NOTF proxy address. By inhibiting the translation of the NOTF within the body of an e-mail message (as opposed to the header of the message, which must be translated to ensure delivery of the message within the existing e-mail infrastructure), confirmation messages that specify the use of the NOTF proxy will be accurate (i.e. translation would make the information inaccurate).

When considering address translations, first understand that only proxy addresses at the domains protected by the individual Reflexion installation are candidates for translation. Addresses at non-protected domains are never translated.

Reflexion keeps a catalog of "true" addresses within the database. Both external addresses and internal, original addresses of the protected domains are stored in the true address catalog 500. Proxy addresses are found by seeking the proxy address itself as a key (e.g. proxy.123@company.com) or by seeking a proxy that is assigned to an outside contact for use a substitute to an internal, original address 502.

Given the true addresses of the sender and receiver, the corresponding proxy can be retrieved on outbound messages and substituted within the message for any and all references to the original, internal address.

Given the proxy address, the corresponding internal, original address can be retrieved on inbound messages and substituted within the message for any and all references to the proxy address.

Address translation becomes more complicated when the product also translates, for both inbound and outbound messages, proxy addresses of colleagues that may or may not exist, but which are created if necessary.

Exemption status adds another level of complexity, as e-mail to and from exempt contacts result in address translations being inhibited.

Additionally, some external contacts are dependent on a third-party proxy, so messages to those contacts should preserve the continuity of use of the proxy that is expected (i.e. the same proxy is presented to the same contact in all messages from the user to that contact).

To understand FIG. 5, being comfortable with the syntax is helpful.

Read 504 as. "a translation method that takes some address 'a' and returns the correct translation for it".

Read 506 as, "a method that returns the proxy address that the outside contact expects to see", which is not always the same as the proxy addressed assigned to the contact.

Referring to FIG. 13, "Name-on-the-Fly" is described. In particular, Name-on-the-Fly (NOTF) is a naming technique that permits the creation of new and unique proxy e-mail addresses without the use of any enabling device or software application. With NOTF, a Reflexion user can create proxy addresses simply by adhering to a predetermined naming scheme.

Typically, the naming scheme includes: when a message is sent to an address at a domain protected by Reflexion that is found to have not yet been created within the application, that some characteristic of the unknown address may resolve to one and only one Reflexion user. If the address does resolve to one and only one Reflexion user, and the user permits NOTF addresses to be created, then Reflexion will create the heretofore-unknown proxy address and put it under management of the application, assign it as a proxy address to the user, and deliver or deny the message as appropriate to the security disposition.

For example, a message sent to the proxy address jsmith.hello@company.com 700 is not found in the table of known proxy addresses by Reflexion 702. Before treating the message as addressed to a non-existent user 708, Reflexion (in this example) isolates the local part "jsmith" 706 and searches for a user that owns the proxy address ismith@company.com 712. If found, see if the user 712 allows NOTF proxy addresses to be created (which can be accomplished in a variety of ways, the preferred method to follow in the example below) 714. If allowed, create a new proxy address ismith.hello@company.com 720 and continue processing the message as if sent to an existing proxy 722, otherwise process the message as addressed to a non-existent user 716.

Reflexion's address translations—where references to a proxy address are translated to the user's original address—are suppressed in the Subject: SMTP header and the body of the message for NOTF address references. Reflexion suppresses NOTF addresses for two reasons. First, the NOTF address was most likely defined by the user and, therefore, is both known and expected in messages sent to the NOTF address. Second, disclosures of a NOTF address may be used for login and password sequences, so it is important to preserve the exact address in case these types of sequences are being reported to the user via e-mail (e.g. "forgot my password" type messages).

Figure 14:
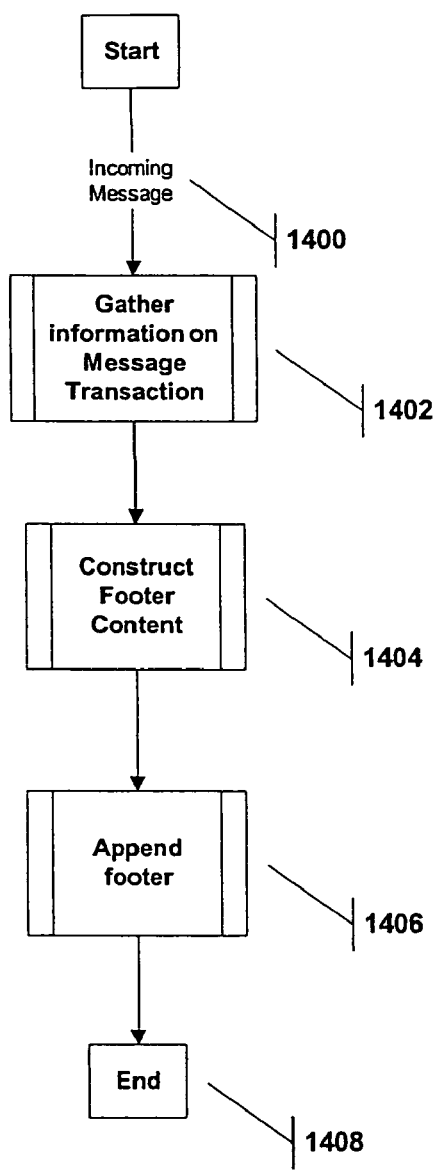
FIG. 14 is a flowchart that represents operations for Adding a Footer to Inbound Messages.
Figure 15:
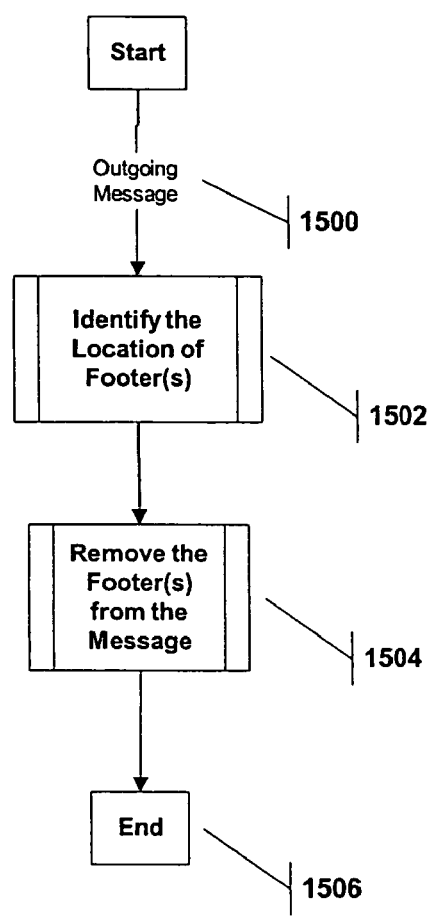
FIG. 15 is a flowchart that represents operations for Removing a Footer from Outbound Messages.

Referring to FIG. 14 and 15, adding and removing footers from messages is described. In particular, attached to the bottom of each incoming message is a footer that contains live controls ("the footer"), which serves as the primary user interface for interacting with and controlling the security model of Reflexion.

On an inbound message 1400, information about the message is gathered as Reflexion processes the message 1402. This information includes transport envelope addresses, date and time, subject, size, attachments, and resolution of the security pass (allow, disallow, flag, etc.).

All of this information is available and used, as appropriate, in the construction of the footer 1404. There are a variety of possible presentations available for implementation. In one embodiment, the footer may present or promote for the benefit of the user the most relevant operations. For example, if a message is being flagged, the most relevant operation would be for the user to stop having the message be flagged, so that operation would have prominence over other possibilities. In other embodiments, a wider range of options may be presented, perhaps to conform to a standard footer structure or to provide the greatest degree of choice and convenience to the user.

Regardless of how the footer is structured, the operations supported by the live controls contained in the footer draws context from the message to which it is attached.

Reflexion constructs the footer and attaches it to the message 1406 before delivery. The footer can be attached anywhere to the document, or it can be a link in the document to an external viewer such as a browser or other application.

In one embodiment, Reflexion constructs both a text and HTML version of the footer, with the use of HTML footers being an option of the enterprise or user. Reflexion converts inbound messages from whatever original form they contain into an appropriate MIME (Multipurpose Internet Mail Extensions, see Request for Comments: 2045 available from The Internet Engineering Task Force) format so that either text or HTML versions of the footer can be viewed, depending on the options selected.

On outbound messages 1500, Reflexion first identifies the location of any and all footers 1502 and removes them from the message 1504. Removal of the footer is not necessary, but it is how messages are handled in the preferred embodiment.

Figure 16:
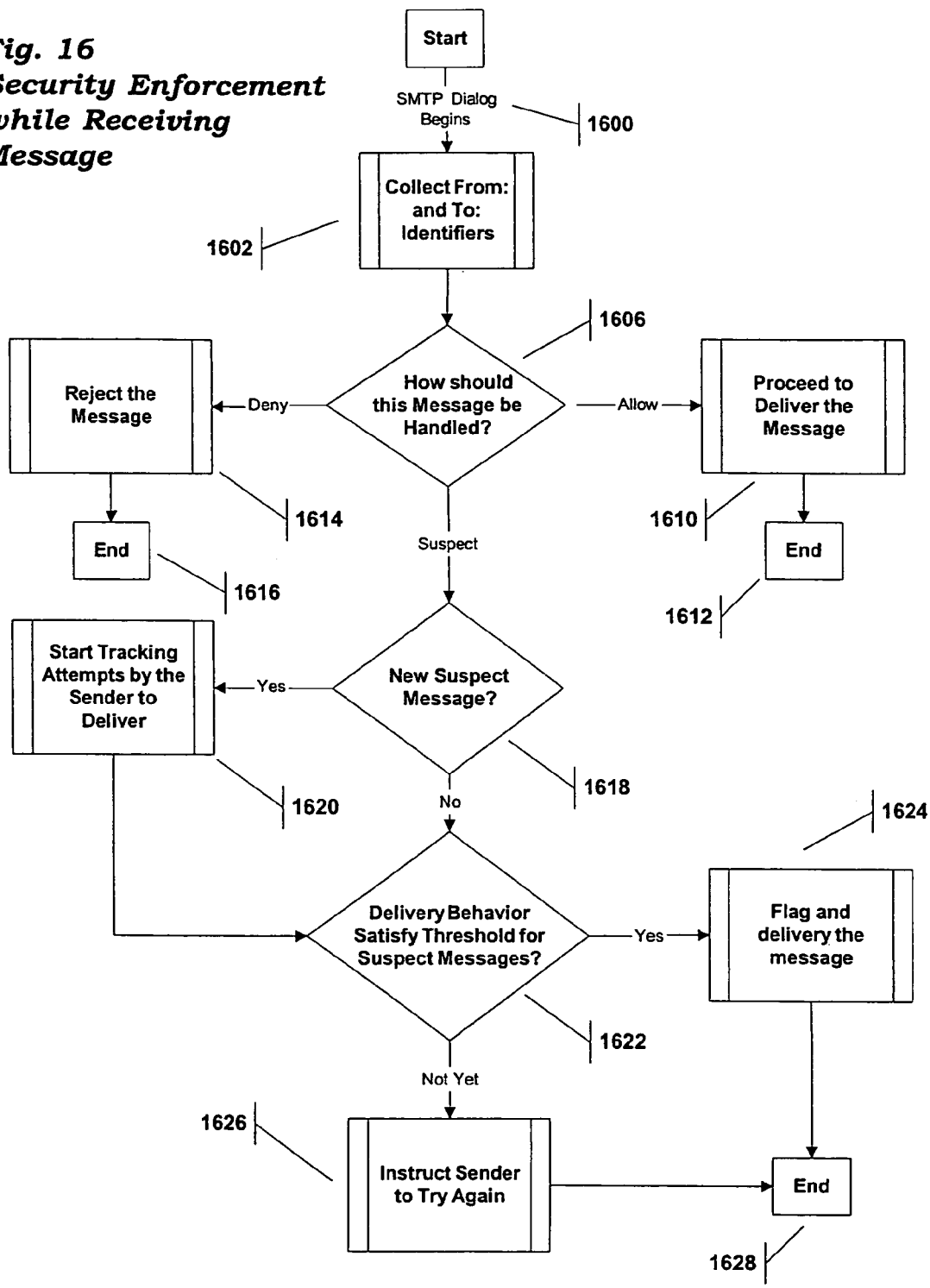
FIG. 16 is a flowchart that represents operations for Security Enforcement while Receiving a Message.

Referring to FIG. 16, security enforcement in regards to receiving messages is described. In particular, security is enforced at the soonest possible time. For e-mail communications, security enforcement takes place in the midst of the receipt of the message, typically using the SMTP (Simple Mail Transport Protocol, see Request for Comments: 0821 available from The Internet Engineering Task Force) protocol.

At the start of the SMTP delivery of a message 1600, the Transport Envelope is delivered ahead of the actual message itself. Reflexion gathers the sender and recipient e-mail addresses from the Transport Envelope 1602 and immediately resolves the security disposition for this address prior to the receipt of any part of the message itself (see FIG. 1 to see more on the system architecture). There are three possible security dispositions 1606; to allow the message to be delivered, to prevent the message from being delivered (see FIG. 3), or to treat the message as suspect.

If the message is denied 1614, the sender may be sent a notice that the message was undeliverable, a notice that the message should be resent to a new Reflexion address, or no not-ice at all depending on the circumstances.

If the message is allowed 1610, Reflexion will accept the message for delivery and complete the SMTP dialog.

If the security disposition of the message is "flagged", the message is suspected of being undesired. Suspected messages are not automatically flagged and delivered. Instead, Reflexion tests the behavior of the sender's mail server (i. e. Mail Transport Agent) by deferring suspect mail for some amount of time.

The first time a new suspect message is received, Reflexion begins to track the number of delivery attempts and the overall time of delivery since the first attempt 1620. Each time a suspect message is attempted for delivery, Reflexion checks to see if the test threshold has been met or exceeded 1622. If the threshold has been satisfied, the message is accepted, flagged and delivered 1624, otherwise the sender is notified to try again later 1626.

This deferral strategy tests that the mail server (Mail Transport Agent) of the sender of a suspect (i. e. "flagged") message is well behaved. Many spammers do not retry messages that have been deferred, thus increasing Reflexion's performance and saving the delivery of a flagged message.

Figure 17:
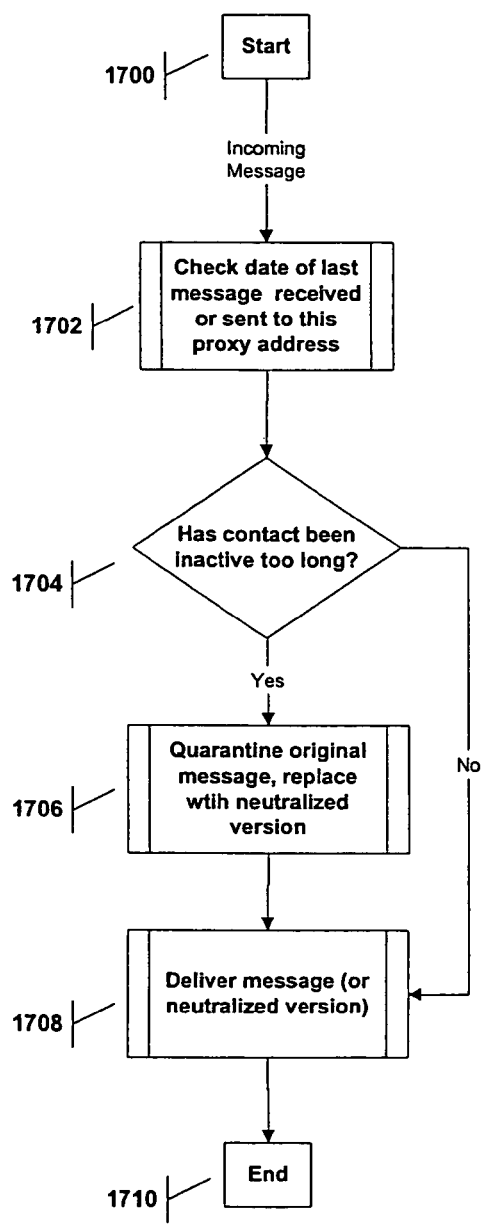
FIG. 17 is a flowchart that represents security enforcement in regards to cold contact anti-virus protection.

Referring to FIG. 17, security enforcement in regards to cold contact anti-virus protection. In general, "Cold Contact" is a simple yet effective early warning system for potentially new e-mail (or other electronic communication medium) borne viruses. The Reflexion paradigm for issuing multiple proxy addresses makes Cold Contact possible. Any proxy address that has been inactive for an amount of time 1704 that is set by the host enterprise will be considered a "cold contact", with one or more protective behaviors triggered after such an assessment, for example possible quarantining of the original message to be replaced by a "safe" substitute 1706.

Cold Contact helps defend against a message sent from a legitimate contact's address to the correct Reflexion proxy address that contains a virus that is not detectable by a virus scanner.

Figure 18:
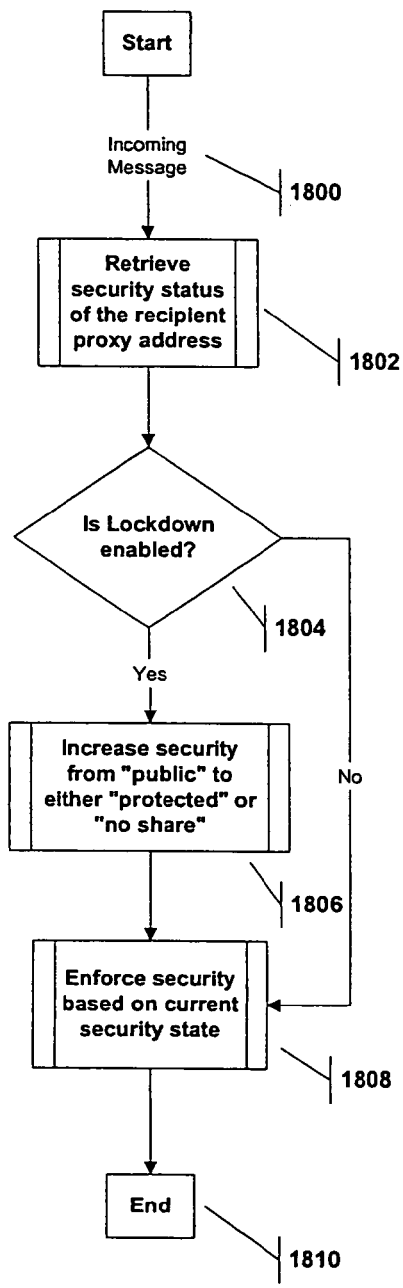
FIG. 18 is a flowchart that represents a lockdown defense against viruses and volume.

Referring to FIG. 18, a lockdown defense against viruses and volume—based attacks are described. In general, "Lockdown" is another simple yet effective defense against volume-based attacks on an enterprise and e-mail borne viruses that spread with spoofed sender addresses. Lockdown is an enterprise-wide, temporary increase in security with optional behaviors that can be triggered automatically by conditions recognized by Reflexion or explicitly by a system administrator.

As inbound messages arrive for processing 1800, Reflexion retrieves the security status on the recipient proxy address as normal 1802. For addresses that have a security state of "public", check to see if Lockdown is in effect 1804. If Lockdown is enabled, temporarily increase the security on the proxy address from "public" to the security state option set in the Lockdown feature, either "protected" or "no share" 1806. Use the temporarily increased security state and deny or permit delivery of the message 1808.

Some of the options for Lockdown are the temporary security state to enforce for "public" proxies, an option to suppress undeliverable or challenge response messages sent back to the sender, and the option to quarantine in the same manner described in FIG. 17 for Cold Contacts and message containing potentially viral attachments or script.

A number of implementations have been described. Nevertheless, it will be understood that various modifications may be made. Accordingly, other implementations are within the scope of the following claims.

What is claimed is:

1. A method for selectively allowing or denying communication access to a user coupled to an electronic communications network by other users coupled to the electronic communications network, comprising:

A. receiving an inbound message over the electronic communications network from a sender user, wherein the inbound message includes an identifier associated with the sender user and an identifier associated with a recipient user, and wherein the sender identifier and the recipient identifier define a channel;

B. for the channel, determining pursuant to security settings dynamically alterable by said recipient user, and using the sender identifier and the recipient identifier, one of at least three security states to be associated with the inbound message while maintaining the channel, wherein a first security state is indicative of allowing delivery of the inbound message to the recipient user, a second security state is indicative of denying delivery of the inbound message to the recipient user, a third security state is indicative of conditionally allowing delivery of the message to the recipient user,
wherein each of the at least three security states are associated with the sender identifier and the recipient identifier included in the inbound message; and
C. for the channel, if delivery is allowed pursuant to the determined security state, adding a user interface to the inbound message, wherein the user interface is configured to allow the recipient user to control the security settings associated with the recipient user while maintaining the channel.

2. The method of claim 1, further comprising determining if the identifier associated with the recipient user was previously generated by the recipient user and is absent from a plurality of proxy identifiers associated with the recipient user.

3. The method of claim 2, further comprising:
adding the identifier associated with the recipient user to the plurality of proxy identifiers.

4. The method of claim 2, wherein determining the recipient identifier was previously generated by the recipient user includes isolating a portion of the recipient identifier to determine if the portion is included in the plurality of proxy identifiers.

5. The method of claim 2, further comprising:
if the first security state is associated with the inbound message, removing the recipient identifier from the inbound message.

6. The method of claim 2, further comprising:
storing data that represents the delivery of the inbound message.

7. The method of claim 1, wherein the user interface includes information contained in the inbound message.

8. The method of claim 1, wherein the user interface includes information representing the security state associated with the inbound message.

9. The method of claim 1, wherein the user interface is adjustable for updating information represented by the user interface.

10. The method of claim 1, wherein content of the user interface is adjusted by the recipient user.

11. The method of claim 1, wherein based on the determined security state, delivery of the inbound message is delayed.

12. The method of claim 1, further comprising determining if the inbound message is exempt from the security states; and if exempt, delivering the inbound message based on the security exemption.

13. The method of claim 12, wherein the security exemption is based on the identifier associated with the sender user.

14. The method of claim 12, wherein the security exemption is based on a domain associated with the recipient identifier.

15. The method of claim 12, wherein the security exemption is based on the recipient identifier and the sender identifier including a similar domain.

16. The method of claim 12, wherein the security exemption is based on the inbound message being a reply message to a second message sent to exempt and non-exempt recipient users.

17. The method of claim 12, wherein the security exemption is valid for a time period.

18. The method of claim 1, wherein determining the security state includes determining when a previous message was received that included the identifier associated with the sender user and the identifier associated with the recipient user.

19. The method of claim 18, further comprising:
delivering the inbound message if the time period between reception of the inbound message and the previous message is less than a predefined time.

20. The method of claim 1, further comprising determining if the security state associated with the inbound message has been escalated.

21. The method of claim 20, further comprising:
if the security state is escalated and the inbound message is associated with the first security state, associating the second security state with the inbound message in place of the first security state.

22. The method of claim 20, further comprising:
if the security state is escalated and the inbound message is associated with the first security state, associating the third security state with the inbound message in place of the first security state.

23. The method of claim 20, wherein the security state escalation is for a predefined period of time.

24. The method of claim 20, wherein determining if the security state has been escalated includes detecting a predefined condition.

25. The method of claim 20, wherein determining if the security state has been escalated includes receiving an instruction from a system administrator.

26. The method of claim 1, wherein the user interface is a footer in the inbound message.

27. The method of claim 1, wherein the user interface is configured to allow the recipient user to control the at least three security states.

28. The method of claim 1, wherein the user interface includes a link to an external user interface, the external user interface is configured to allow the recipient user to control the communication access to the recipient user.

29. The method of claim 28, wherein the external user interface is configured to allow the recipient user to control the at least three security states.

30. The method of claim 1, wherein the user interface includes information associated with the inbound message.

31. The method of claim 1, wherein the inbound message comprises an e-mail message.

32. A system for selectively allowing or denying communication access to a recipient user coupled to an electronic communication network by other users coupled to the electronic communications network, comprising:
A. a receiver configured to receive an inbound message over the electronic communications network from a sender user, wherein the inbound message includes an identifier associated with a sender user and an identifier associated with a recipient user, and wherein the sender identifier and the recipient identifier define a channel; and
B. a processor configured, for the channel, to determine pursuant to security settings dynamically alterable by said recipient user, and using the sender identifier and the recipient identifier, one of at least three security states to be associated with the inbound message while maintaining the channel, wherein
a first security state is indicative of allowing delivery of the inbound message to the recipient user,
a second security state is indicative of denying delivery of the inbound message to the recipient user,
a third security state is indicative of conditionally allowing delivery of the message to the recipient user,
wherein each of the at least three security states are associated with the sender identifier and the recipient identifier included in the inbound message, C. wherein if delivery is allowed pursuant to the determined security state for the channel, the processor is further configured to add a user interface to the inbound message, wherein the user interface is configured to allow the recipient user to control the security settings associated with the recipient user while maintaining the channel.

33. The system of claim 32, wherein the processor is further configured to determine if the identifier associated with the recipient user was previously generated by the recipient user and is absent from a plurality of proxy identifiers associated with the recipient user.

34. The system of claim 33, wherein the processor is further configured to add the identifier associated with the recipient user to the plurality of proxy identifiers.

35. The system of claim 33, wherein determining the recipient identifier was previously generated by the recipient user includes isolating a portion of the recipient identifier to determine if the portion is included in the plurality of proxy identifiers.

36. The system of claim 33, wherein if the first security state is associated with the inbound message, the processor is further configured to remove the recipient identifier from the inbound message.

37. The system of claim 32, wherein the user interface includes information contained in the inbound message.

38. The system of claim 32, wherein the user interface includes information representing the security state associated with the inbound message.

39. The system of claim 32, wherein the processor is further configured to adjust the user interface for updating information represented by the user interface.

40. The system of claim 32, wherein the processor is further configured to adjust the user interface for updating information represented by the user interface, wherein the recipient user initiates the adjustment.

41. The system of claim 32, wherein based on the determined security state, the processor is further configured to delay delivery of the inbound message.

42. The system of claim 32, wherein the processor is further configured to determine if the inbound message is exempt from the security states and deliver the inbound message based on the security exemption.

43. The system of claim 32, wherein determining the security state includes determining when a previous message was received that included the identifier associated with the sender and the identifier associated with the recipient user.

44. The system of claim 43, wherein the processor is further configured to deliver the inbound message if the time period between reception of the inbound message and the previous message is less than a predefined time.

45. The system of claim 32, wherein the processor is further configured to determine if the security state associated with the inbound message has been escalated.

46. The system of claim 45, wherein if the security state is escalated and the inbound message is associated with the first security state, the processor is further configured to associate the second security state with the inbound message in place of the first security state.

47. The system of claim 45, wherein if the security state is escalated and the inbound message is associated with the first security state, the processor is further configured to associate the third security state with the inbound message in place of the first security state.

48. The system of claim 45, wherein the security state escalation is for a predefined period of time.

49. The system of claim 45, wherein determining if the security state has been escalated includes detecting a predefined condition.

50. The system of claim 45, wherein determining if the security state has been escalated includes receiving an instruction from a system administrator.

51. A computer program product stored on a non-transitory computer readable medium having a plurality of instructions stored thereon which, when executed by a processor, cause that processor to:
A. receive an inbound message over an electronic communications network from a sender user, wherein the inbound message includes an identifier associated with a sender user and an identifier associated with a recipient user, and wherein the sender identifier and the recipient identifier define a channel;
B. for the channel, determine pursuant to security settings dynamically alterable by said recipient user, and using the sender identifier and the recipient identifier, one of at least three security states associated with the inbound message while maintaining the channel, wherein
a first security state is indicative of allowing delivery of the inbound message to the recipient user,
a second security state is indicative of denying delivery of the inbound message to the recipient user,
a third security state is indicative of conditionally allowing delivery of the message to the recipient user,
wherein each of the at least three security states are associated with the sender identifier and the recipient identifier included in the inbound message; and
C. for the channel, if delivery is allowed pursuant to the determined security state, add a user interface to the inbound message, wherein the user interface is configured to allow the recipient user to control the security settings associated with the recipient user while maintaining the channel.

52. The computer program product of claim 51, further comprising instructions for:
determining if the identifier associated with the recipient user was previously generated by the user and is absent from a plurality of proxy identifiers associated with the recipient user.

53. The computer program product of claim 52, further comprising instructions for:
adding the identifier associated with the recipient user to the plurality of proxy identifiers.

54. The computer program product of claim 51, wherein the user interface includes information contained in the inbound message.

55. The computer program product of claim 51, further comprising instructions for:
determining if the inbound message is exempt from the security states; and
delivering the inbound message based on the security exemption.

56. The computer program product of claim 55, wherein the security exemption is based on the identifier associated with the sender user.

57. The computer program product of claim 51, further comprising instructions for:
determining the security state further includes determining when a previous message was received that included the identifier associated with the sender user and the identifier associated with the recipient user.

58. The computer program product of claim 57, further comprising instructions for:

delivering the inbound message if the time period between reception of the inbound message and the previous message is less than a predefined time.

59. The computer program product of claim 51, further comprising instructions for:

determining if the security state associated with the inbound message has been escalated.

60. The computer program product of claim 59, further comprising instructions for:

if the security state is escalated and the inbound message is associated with the first security state, associating the second security state with the inbound message in place of the first security state.

* * * * *